United States Patent
Miyazaki

(10) Patent No.: US 7,889,890 B2
(45) Date of Patent: Feb. 15, 2011

(54) IMAGE CAPTURE APPARATUS AND CONTROL METHOD THEREFOR

(75) Inventor: Yasuyoshi Miyazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1094 days.

(21) Appl. No.: 11/201,643

(22) Filed: Aug. 10, 2005

(65) Prior Publication Data

US 2006/0044422 A1    Mar. 2, 2006

(30) Foreign Application Priority Data

Aug. 31, 2004   (JP)   .............................. 2004-252311

(51) Int. Cl.
*G06K 9/00*    (2006.01)
*G06K 9/68*    (2006.01)
*H04N 9/68*    (2006.01)

(52) U.S. Cl. ........................................ 382/118; 382/218

(58) Field of Classification Search .................. 382/115, 382/118, 162, 164, 167, 173, 181, 218, 219; 358/515, 518, 520, 530; 348/345, 350, 362, 348/364, 371, E5.035, E5.038
See application file for complete search history.

(56) References Cited

U.S. PATENT DOCUMENTS

| | | | |
|---|---|---|---|
| 6,529,630 B1 * | 3/2003 | Kinjo | 382/190 |
| 6,819,783 B2 * | 11/2004 | Goldberg et al. | 382/115 |
| 7,269,292 B2 * | 9/2007 | Steinberg | 382/243 |
| 7,298,412 B2 * | 11/2007 | Sannoh et al. | 348/348 |
| 7,315,630 B2 * | 1/2008 | Steinberg et al. | 382/118 |
| 7,471,846 B2 * | 12/2008 | Steinberg et al. | 382/274 |
| 2001/0019364 A1 | 9/2001 | Kawahara | |
| 2003/0071908 A1 | 4/2003 | Sannoh et al. | |
| 2006/0044422 A1 * | 3/2006 | Miyazaki | 348/234 |
| 2007/0110305 A1 * | 5/2007 | Corcoran et al. | 382/167 |

FOREIGN PATENT DOCUMENTS

| | | |
|---|---|---|
| EP | 1471455 A | 10/2004 |
| JP | 2001-222048 A | 8/2001 |
| JP | 2003-107555 A | 4/2003 |

* cited by examiner

*Primary Examiner*—Amir Alavi
(74) *Attorney, Agent, or Firm*—Canon U.S.A., Inc. I.P. Division

(57) ABSTRACT

At least one exemplary embodiment can control light emission so as to facilitate a face area of a subject to be adequately photographed. In the at least one exemplary embodiment, respective face areas of the subject can be detected from captured image signals acquired before and after preliminary light emission, and a luminance comparison calculation can be performed between the detected face areas from the captured image signals, so that light amount control can be performed in an area centered on the face area of the subject.

20 Claims, 7 Drawing Sheets

SECOND IMAGE

SECOND IMAGE

THIRD IMAGE

THIRD IMAGE

MAIN PHOTOGRAPHY IMAGE

MAIN PHOTOGRAPHY IMAGE

FACE DETECTION EF

CONVENTIONAL METHOD

| 1 | 1 | 1 | 3 | 3 | 2 | 1 |
|---|---|---|---|---|---|---|
| 1 | 1 | 1 | 3 | 5 | 4 | 1 |
| 1 | 1 | 1 | 3 | 5 | 4 | 1 |
| 1 | 8 | 8 | 8 | 8 | 3 | 2 |
| 1 | 8 | 8 | 8 | 8 | 3 | 2 |

SECOND IMAGE

FIG.4B

| 1 | 1 | 1 | 5 | 5 | 4 | 1 |
|---|---|---|---|---|---|---|
| 1 | 1 | 1 | 5 | 7 | 6 | 1 |
| 1 | 1 | 1 | 5 | 7 | 6 | 1 |
| 1 | 13 | 13 | 13 | 13 | 5 | 2 |
| 1 | 13 | 13 | 13 | 13 | 5 | 2 |

THIRD IMAGE

FIG.4C

| 0 | 0 | 0 | 2 | 2 | 2 | 0 |
|---|---|---|---|---|---|---|
| 0 | 0 | 0 | 2 | 2 | 2 | 0 |
| 0 | 0 | 0 | 2 | 2 | 2 | 0 |
| 0 | 5 | 5 | 5 | 5 | 2 | 0 |
| 0 | 5 | 5 | 5 | 5 | 2 | 0 |

IMAGE AFTER COMPARISON
CALCULATION

FACE DETECTION AVAILABLE

| 1 | 1 | 1 | 3 | 3 | 2 | 1 |
|---|---|---|---|---|---|---|
| 1 | 1 | 1 | 3 | 5 | 4 | 1 |
| 1 | 1 | 1 | 3 | 5 | 4 | 1 |
| 1 | 8 | 8 | 8 | 8 | 3 | 2 |
| 1 | 8 | 8 | 8 | 8 | 3 | 2 |

SECOND IMAGE

FIG.4E

| 1 | 1 | 1 | 5 | 5 | 4 | 1 |
|---|---|---|---|---|---|---|
| 1 | 1 | 1 | 5 | 7 | 6 | 1 |
| 1 | 1 | 1 | 5 | 7 | 6 | 1 |
| 1 | 13 | 13 | 13 | 13 | 5 | 2 |
| 1 | 13 | 13 | 13 | 13 | 5 | 2 |

THIRD IMAGE

FIG.4F

| 0 | 0 | 0 | 2 | 2 | 2 | 0 |
|---|---|---|---|---|---|---|
| 0 | 0 | 0 | 2 | 2 | 2 | 0 |
| 0 | 0 | 0 | 2 | 2 | 2 | 0 |
| 0 | 5 | 5 | 5 | 5 | 2 | 0 |
| 0 | 5 | 5 | 5 | 5 | 2 | 0 |

IMAGE AFTER COMPARISON
CALCULATION

CONVENTIONAL METHOD

SECOND IMAGE

THIRD IMAGE

DIFFERENCE IMAGE

IMAGE WEIGHTING

IMAGE CAPTURE APPARATUS AND CONTROL METHOD THEREFOR

BACKGROUND OF THE INVENTION

1. Field of the Invention

The present invention relates to a signal processing method. More particularly, though not exclusively, a signal processing method for a digital camera and/or a video camera, using an image sensor.

2. Description of the Related Art

In a conventional image capture apparatus, light amount control is performed based on data on an amount of reflected light from a subject within an image frame at the time of flash photography.

Hence, in a case where there exists a subject having a high or low reflectance within an image frame, the amount of reflected light can adversely affect the light amount control.

For example, in a case where a subject puts on black clothes, if the conventional system is employed, since light amount control is performed based on data on an amount of reflected light from the subject within an image frame, the face of the subject is illuminated with more than an adequate amount of flash light.

As a result, the face of the subject is photographed in an overexposed state.

Hence, Japanese Patent Application Laid-Open No. 2003-107555 discuses a technique of detecting the face of a subject from a captured image before AF (Auto Focusing) and performing exposure control with the detected face area of the subject given weighting.

With the technique as described above, photography can be made in such a manner as to focus on the face of the subject, thereby allowing the face area to have a most suitable luminance.

However, for example, under the circumstance where luminance is not sufficient (in a case where a person is photographed with a night view for a background), it is difficult to accurately detect the face of the person from the captured image.

Additional conventional methods attempt to detect the face of a person, for example one method regards a flesh colored area having more than a predetermined size as a face area, while another method detects a contour of the face and a shape of the eyes from luminance information and regards them as a face area. However, typically detection accuracy is deteriorated in darkness in conventional methods.

SUMMARY OF THE INVENTION

At least one exemplary embodiment relates to an image capture apparatus configured to perform light emission control facilitating the image capturing of a face area of a subject. In at least one exemplary embodiment of the image capture apparatus, respective face areas of the subject are detected from captured image signals acquired before and after preliminary light emission, and a luminance comparison calculation is performed between the detected face areas from the captured image signals, so that light amount control can be performed in an area centered on the face area of the subject.

At least one further exemplary embodiment is directed to an image capture apparatus which includes a first image data acquiring unit configured to acquire first image data when preliminary light emission is not performed, a second image data acquiring unit configured to acquire second image data when preliminary light emission is performed, a face area detection unit configured to detect a face area of a subject from at least one of the first image data acquired by the first image data acquiring unit and the second image data acquired by the second image data acquiring unit, a luminance comparison calculation unit configured to compare and calculate the first image data and the second image data with respect to luminance based on the face area of the subject detected by the face area detection unit, and a main light emission amount determination unit configured to determine an amount of main light emission based on a result of the calculation by the luminance comparison calculation unit.

Another exemplary embodiment is directed to a control method for an image capture apparatus which includes a first image data acquiring step of acquiring first image data when preliminary light emission is not performed, a second image data acquiring step of acquiring second image data when preliminary light emission is performed, a face area detection step of detecting a face area of an subject from at least one of the first image data acquired by the first image data acquiring step and the second image data acquired by the second image data acquiring step, a luminance comparison calculation step of comparing and calculating the first image data and the second image data with respect to luminance based on the face area of the subject detected by the face area detection step, and a main light emission amount determination step of determining an amount of main light emission based on a result of the calculation by the luminance comparison calculation step.

In at least one exemplary embodiment, a program causes a computer to perform the above control method.

Further features of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments of the invention.

FIGS. 4A to 4F illustrate views showing a luminance calculation processing in the first exemplary embodiment and the conventional method;

FIGS. 7A to 7D illustrate views showing an example in which a face area is subjected to weighting in accordance with at least one exemplary embodiment.

DETAILED DESCRIPTION OF THE EMBODIMENTS

Figure 1:
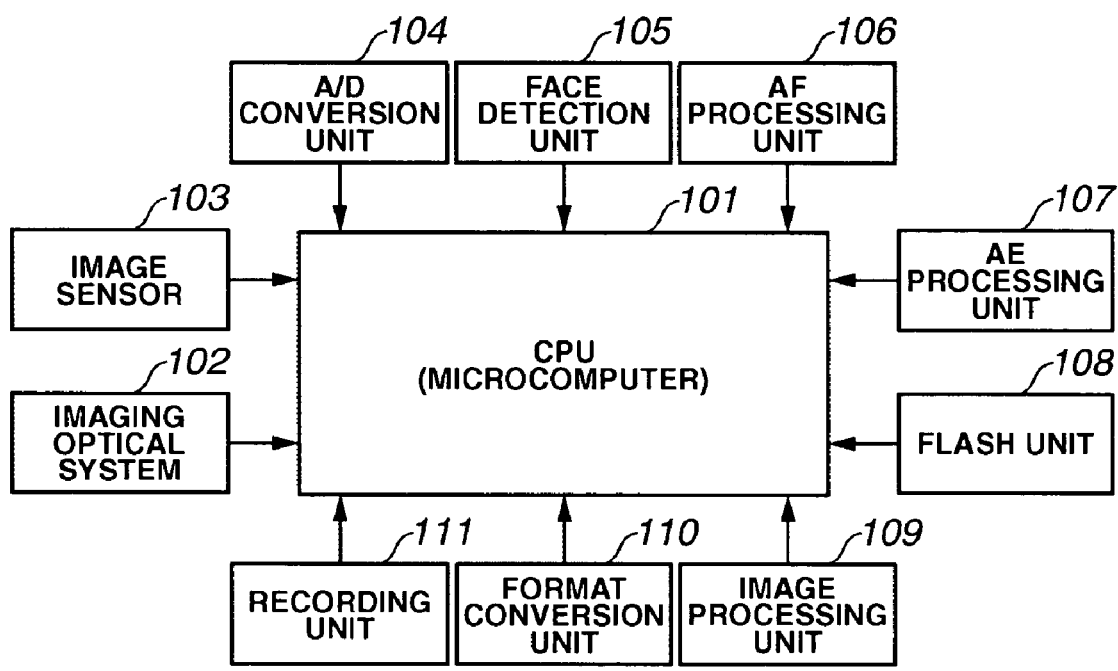
FIG. 1 illustrates a block diagram of an image capture apparatus according to a first exemplary embodiment.

The following description of exemplary embodiment(s) is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate. For example, AF and AE processing techniques as known by one of ordinary skill in the relevant art are intended to be part of the enabling description where appropriate. Additionally exemplary embodiments are not limited to visual optical photographic systems, for example the system can be designed for use with infrared and other wavelength imaging systems.

Notice that similar reference numerals and letters refer to similar items in the following figures, and thus once an item is defined in one figure, it may not be discussed for following figures.

Exemplary embodiments will be described in detail below with reference to the drawings.

First Exemplary Embodiment

FIG. 1 illustrates a block diagram of an image capture apparatus according to a first exemplary embodiment.

In FIG. 1, reference numeral 101 denotes a CPU (central processing unit) (e.g., a microcomputer, or microprocessor (e.g., Pentium 4)) configured to perform various controls for the image capture apparatus (e.g., camera). Reference numeral 102 denotes an imaging optical system (e.g., a system including a lens, a diaphragm, a shutter), and reference numeral 103 denotes an image sensor (e.g., a CCD (charge-coupled device) having a photoelectric conversion function, other image sensors as known by one of ordinary skill in the relevant arts, and equivalents) Reference numeral 104 denotes an A/D conversion unit configured to convert an analog signal acquired from the image sensor 103 into a digital signal. Reference numeral 105 denotes a face detection unit configured to detect face information (e.g., area, shape, position) of the face of a subject from image data generated based on the output of the A/D conversion unit 103. Reference numeral 106 denotes an AF (Auto Focusing) processing unit configured to determine a focusing position, and reference numeral 107 denotes an AE (Auto Exposure) processing unit configured to obtain a subject luminance value Bv, and based on the value Bv, determine Av (aperture), Tv (shutter speed), and Sv (sensitivity) values from a program chart (not shown) so as to automatically control exposure.

Here, $Bv = Av + Tv - Sv$ (1)

Reference numeral 108 denotes a flash unit (e.g., a flash light emission device). The CPU 101 can indicate whether the flash unit 108 is to perform a flash light emission based on the Bv, Av, Tv, and Sv values determined by the AE processing unit 107.

If flash light emission is performed, the flash unit 108 can perform a preliminary light emission.

Next, the CPU 101 can calculate an amount of main light emission, where the amount of main light emission can be calculated from data (e.g., luminance comparison value) on reflected light from the subject caused by the preliminary light emission. The CPU 101 can then, transmit a signal to the flash unit 108 to perform main light emission.

Further, in a case where a highly reflective object is included in the image frame, the reflection of light from the highly reflective object is strong, and obtaining a suitable image by photography using flash light emission can be difficult.

It should be noted that the highly reflective object referred to herein is an object, which is determined to have a reflection level hindering flash photography using preliminary light emission.

In some exemplary embodiments, flash photography using a preliminary light emission can be used even when an object generally having a high reflectance, such as a mirror, is included in the image frame, if the object itself is small.

Further, what is referred to herein as the case of hindering flash photography is a configuration less favorable for flash photography even if an amount of light emission is controlled by adjusting sensitivity and exposure.

Reference numeral 109 denotes an image processing unit configured to process a captured image. Reference numeral 110 denotes a format conversion unit configured to convert the image data processed by the image processing unit 109 into another format (e.g., JPEG, TIFF). Reference numeral 111 denotes a recording unit configured to record the image data converted by the format conversion unit 110.

Figure 2:
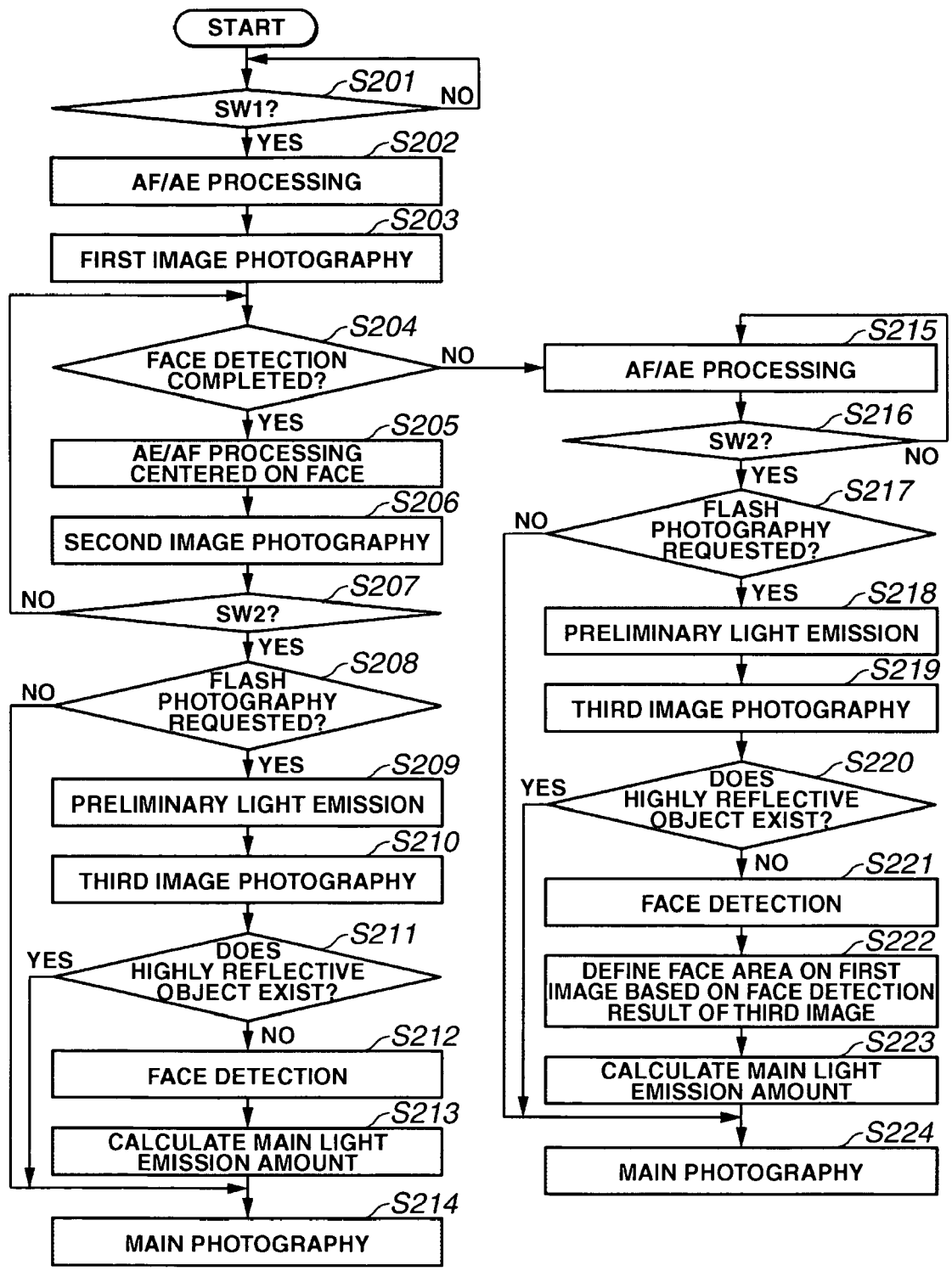
FIG. 2 illustrates a flowchart showing processing in the first exemplary embodiment.

FIG. 2 illustrates a flowchart explaining the process steps in accordance with the first exemplary embodiment, while FIGS. 3A to 3F illustrate views showing the process in the first exemplary embodiment compared to that of a conventional method, and FIGS. 4A to 4F are views showing luminance calculation process in the first exemplary embodiment compared with that of a conventional method.

Operation of the first exemplary embodiment will be described in accordance with the flowchart of FIG. 2.

At step S201, when a shutter button (SW1) is operated (e.g., half-pressed) by a user, the AF processing unit 106 and the AE processing unit 107, at step S202, perform AF and AE processing operations on at least a portion (e.g., the entire) image frame.

Then, at step S203, first image data is acquired (e.g., by a first image data acquiring unit), and the acquired first image data is stored temporarily (e.g., in a buffer memory) (not shown).

The AF process operation, used in exemplary embodiments, can take the form of many methods, for example it can be a method of selecting one or a plurality of focus detecting areas based on distance information or contrast information from a plurality of focus detecting areas set in advance on the image frame, and driving a focusing lens in such a manner as to fit a subject existing in the selected focus detecting area into a depth of field.

Further, the AE processing operation, used in exemplary embodiments, can take the form of many methods for example it can be a method of enlarging weighting of a luminance value detected from a light metering area corresponding to the selected focus detecting area and calculating a luminance value of a subject to be captured.

At step S204, the face detection unit 105 can perform face detection on the first image data temporarily stored at step S203, to acquire face information (e.g., face area, a face position, reflection data, other data associated with the face as known by one of ordinary skill in the relevant arts, and equivalents).

If the face detection can be performed at step S204, the AF processing unit 106 and the AE processing unit 107, at step S205, perform setting AF and AE values for performing the AF and AE processing operations for an image area, where the image area is centered on the face area in the first image data based on the face information acquired at step S204.

Then, at step S206, a second image data (FIG. 3A) is acquired (e.g., by a second image data acquiring unit), and the acquired second image data is temporarily stored (e.g., in a buffer memory) (not shown). Note that although first and second image data acquiring units are identified separately as an example, the functions could be combined into a single unit or more than two units (e.g., camera, CCD, other image capturing and/or acquiring units as known by one of ordinary skill in the relevant arts, and equivalents).

Figure 3A:
FIGS. 3A to 3F illustrate views showing the processing in the first exemplary embodiment and a conventional method.
Figure 3D:
Figure 3B:
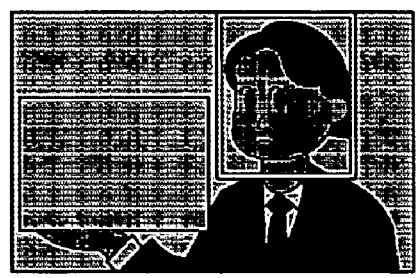

It should be noted that, while the first exemplary embodiment can perform the AF and AE processing operations for an image area centered on the face area, the conventional method performs the AF and AE processing operations for the entire image frame (FIG. 3D).

Specifically, a focusing lens of the image sensor 103 can be driven so as to focus on the detected face area, and a luminance value of the face area is directly regarded as a subject luminance value, so as to adequately photograph the face area.

Processing from step S204 to step S206 is repeated until the shutter button (SW2) is operated (e.g., fully pressed) by the user at step S207.

When the shutter button (SW2) is operated (e.g., fully pressed) by the user at step S207, the CPU 101 determines at step S208 whether to perform flash photography depending on a condition of the image frame.

When, at step S208, the CPU 101 determines that flash photography can be performed, the flash unit 108 can perform preliminary light emission at step S209.

Further, when, at step S208, the CPU 101 determines that flash photography is unnecessary, the CPU 101 can perform main photography at step S214 without emitting flash light, and can record a captured image on the recording unit 111.

At step S209, the flash unit 108 can perform preliminary light emission, while the CPU 101 acquires a captured third image data (FIG. 3B) based on data on reflected light during preliminary light emission at step S210.

Figure 3E:
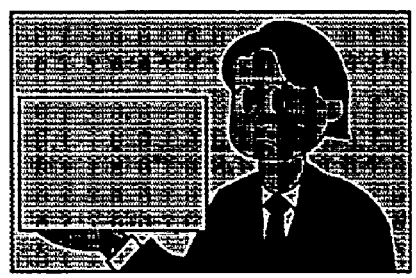

It should be noted that, while the first exemplary embodiment can perform the AF and AE processing operations for an image area centered on the face area (FIG. 3B), the conventional method performs the AF and AE processing operations for the entire image frame (FIG. 3E).

When, at step S211, it is determined that a highly reflective object is not included in the image frame from the distribution of the reflected light data obtained during the preliminary light emission performed at step S209, the face detection unit 105 performs, at step S212, face detection for the third image data acquired at step S210, and acquires face information (e.g., face area, face position, reflected light data).

Further, when, at step S211, the CPU 101 determines that a highly reflective object is included in the image frame from the distribution of the reflected light data obtained during the preliminary light emission performed at step S209, the CPU 101 performs, at step S214, main photography based on the face information acquired at step S204 without performing flash photography, and records a captured image on the recording unit 111.

At step S213, the CPU 101 can perform a comparison calculation (differential calculation) in luminance between the face area of the second image data (FIG. 3A) acquired at step S206 and the face area of the third image data (FIG. 3B) acquired at step S210.

Then, based on a result of the comparison calculation (e.g., the luminance comparison value), the CPU 101 can calculate an amount of main light emission, and at step S214, main photography can be performed using flash light emission.

In the AF and AE processing operations, in a case where an object at a short distance or an object having high contrast exists in the focus detection area, set in advance, the AF or AE processing operation can be adversely affected.

However, by detecting the face area from the image frame via image processing, the AF and AE processing operations centered on the face of a subject can be performed even if an object exists at a distance shorter than the subject person distance.

For example, in a case where, as shown in FIGS. 3A to 3F, a subject with a white box 300 disposed in front of the face is photographed, according to some AF and AE processing operations, a focusing control, an exposure control, and a light amount control can be performed on the basis of the position of the white box.

Figure 3C:
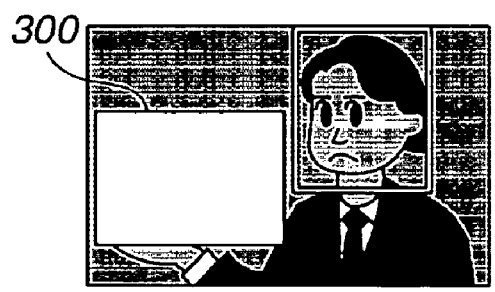
Figure 3F:
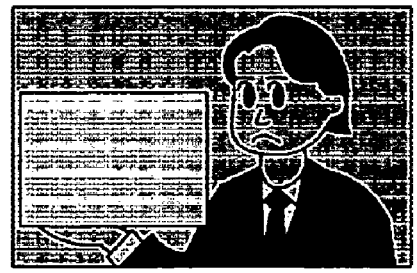

Thus, the luminance value of the entire image frame often becomes, a value causing, underexposure (FIG. 3F).

However, in accordance with at least one exemplary embodiment, by performing detection of the face area, exposure is not adversely affected by an object other than a person, and, therefore, exposure control and light amount control can be performed in such a manner as to facilitate the face of a person to be appropriately photographed (FIG. 3C).

Returning to the flowchart of FIG. 2, if, at step S204, the face detection unit 105 cannot perform face detection, for example, in case where a subject is dark, the AF processing unit 105 and the AE processing unit 107 perform, at step S215, the setting of an AF value and an AE value for performing the known AF and AE processing operations for the entire image frame.

When, at step S216, the shutter button (SW2) is operated (e.g., fully pressed) by the user, the CPU 101 determines, at step S217, whether to perform flash photography according to a condition of the image frame.

When, at step S217, the CPU 101 determines that flash photography can be used, the flash unit 108 can perform preliminary light emission at step S218.

When, at step S217, the CPU 101 determines that flash photography is unnecessary, the CPU 101 can perform, at step S224, main photography without emitting flash light, and can record a captured image on the recording unit 111.

At step S218, the flash unit 108 can perform preliminary light emission, and the CPU 101 can acquire, at step S219, third image data captured based on the reflected light data obtained during the preliminary light emission emitted during step S218.

When, at step S220, the CPU 101 determines that a highly reflective object is not included in the image frame from the distribution of the reflected light data obtained during the preliminary light emission performed at step S218, the face detection unit 105 can perform, at step S212, face detection for the third image data acquired at step S219, and can acquire face information (e.g., face area, face position, reflected light data).

Further, when, at step S220, the CPU 101 determines that a highly reflective object is included in the image frame, the CPU 101 performs, at step S224, main photography without emitting flash light, and records a captured image on the recording unit 111.

At step S222, the CPU 101 defines a face area on the first image data, which can be at the same position as the face area acquired at step S221.

At step S223, the CPU 101 can perform a comparison calculation (differential calculation) in luminance between the face area of the first image data acquired at step S203 and the face area of the third image data acquired at step S219.

Then, the CPU 101 calculates an amount of main light emission based on a result of the comparison calculation, and at step S224, performs main photography using flash light emission.

It should be noted that, while the method of the specific luminance comparison calculation in the first exemplary embodiment, as shown in FIGS. 4A to 4C, splits the second image data (FIG. 4A) and the third image data (FIG. 4B) into an arbitrary number of blocks (5×7 blocks in FIGS. 4A to 4C), respectively, and compares and calculates luminance values within a rectangular frame surrounding the set face area 400, the conventional method compares and calculates luminance values within the entire image frame 410 (FIGS. 4D and 4E).

An amount of main light emission can be calculated to cause appropriate luminance values, on the basis of luminance data (e.g., luminance comparison values, FIG. 4C) obtained by the comparison calculation of the set face area. Image data (FIG. 3C) acquired by performing flash light emission photography at the calculated amount of main light emission becomes a main captured image. It should be noted that, according to the conventional method, the entire image frame is subjected to the luminance comparison calculation, and an amount of main light emission is calculated so as to cause appropriate luminance values, on the basis of luminance data (FIG. 4F) obtained by the comparison calculation. Hence, image data (FIG. 3F) acquired as a result of flash photography sometimes contains a subject not photographed with adequate luminance.

According to the first exemplary embodiment as described above, since an amount of main light emission is calculated with emphasis on the face area, flash photography can be performed in accordance with at least one exemplary embodiment while reducing the effect caused by a reflecting object other than the face of a subject.

Thus, in accordance with at least one exemplary embodiment, one can perform photography having appropriate luminance in the face area.

Furthermore, even in a case where there is a highly reflective object existing in the image frame and a face that is not detectable from the subject image during preliminary light emission, since, in accordance with at least one exemplary embodiment, the AF and AE processing operations can be performed based on face information acquired before the preliminary light emission, photography can be performed where a weighting factor is placed on the face area most appropriately photographed.

Second Exemplary Embodiment

Figure 5:
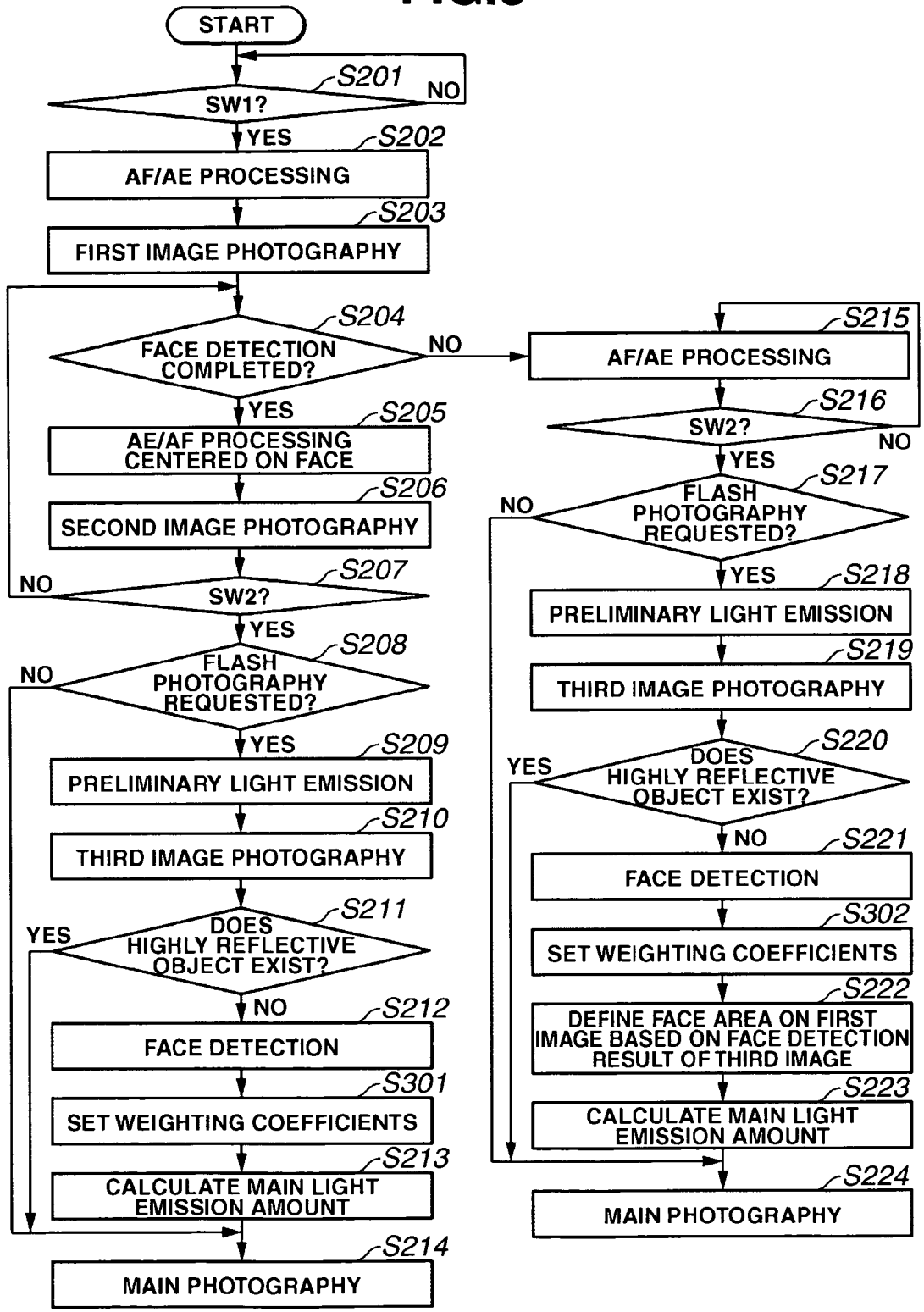
FIG. 5 illustrates a flowchart showing processing in a second exemplary embodiment.

FIG. 5 illustrates a flowchart explaining of the process steps in an image capture apparatus according to a second exemplary embodiment.

The operation of the second exemplary embodiment will be described by using the flowchart of FIG. 5.

In FIG. 5, the steps for performing the same process as the first exemplary embodiment are allotted the same step numbers.

The second exemplary embodiment, differs from the first exemplary embodiment by the inclusion of additional steps related to the setting of weighting coefficients (steps S301 and S302) to the face area. The differing steps of the second exemplary embodiment will be described below.

Here, similar to the first exemplary embodiment, at step S212, the face detection unit 105 can perform face detection for the third image data acquired at step S210, and acquire face information (e.g., face area, face position, reflected light data) and, then, the process proceeds to step S301.

At step S301, the CPU 101 can perform a weighting process (e.g., sets weighting coefficients) regarding the luminance of the face area according to a condition of the image frame.

At step S213, the CPU 101 can perform a comparison calculation in luminance between the second image data acquired at step S206 and the image data acquired by the weighting processing of step S301.

Then, based on a result of the comparison calculation, an amount of main light emission is calculated, and at step S214, the CPU 101 performs main photography.

Further, at step S221, the face detection unit 105 can perform face detection for the third image data acquired at step S219, and can acquire face information (e.g., face area, face position, reflected light data), and then, the process proceeds to step S302.

At step S302, the CPU 101 can perform a weighting process (e.g., sets weighting coefficients) regarding the luminance of the face area according to a condition of the image frame.

At step S222, the CPU 101 defines a face area on the first image data at the same position as the face area acquired at step S221.

Then, at step S223, the CPU 101 can perform a comparison calculation in luminance between the first image data acquired at step S203 and the image data acquired by the weighting process of step S302, and based on a result of the comparison calculation, calculates an amount of main light emission. Then, at step S224, the CPU 101 performs main photography.

A specific operation of the weighting process will be described by comparing the conventional method (FIGS. 6A to 6D) with a method in accordance with the second exemplary embodiment (FIGS. 7A to 7D).

In FIGS. 6A to 6D, an operation of weighting using the entire image frame as a weighting target, is performed by the conventional method.

Figures 6A, 6B, 6C, 6D:
FIGS. 6A to 6D illustrate views showing an example in which the entire image frame is subjected to weighting in accordance with at least one exemplary embodiment.

FIG. 6A illustrates the second image data acquired at step S206, and FIG. 6B shows the third image data acquired at step S210.

FIG. 6C illustrates difference image data, which can be obtained by a finite difference between the third image data and the second image data. The CPU 101 can perform a weighting process putting a weighting on the center of the image as illustrated in FIG. 6D.

In FIGS. 7A to 7D, an operation of weighting using the detected face area as a weighting target, can be performed in the second exemplary embodiment.

In the second exemplary embodiment, the second image data illustrated in FIG. 7A and the third image data illustrated in FIG. 7B are image data acquired similarly as described above with respect to FIGS. 6A and 6B.

Next, the detection of a face area is performed for both image data.

Then, difference image data (FIG. 7C) is obtained similarly as in the first exemplary embodiment.

Next, for the obtained difference image data, a weighting process is performed which enlarges the weighting of the detected face area illustrated in FIG. 7D.

In the second exemplary embodiment as described above, since the weighting regarding the face area is performed according to a condition of the face area in the image frame, flash photography can be performed in such a manner as to facilitate the face area to be photographed with adequate luminance without being affected by an object other than the face of a subject.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-252311 filed Aug. 31, 2004, which is hereby incorporated by reference herein in its entirety.

What is claimed is:

1. An image capture apparatus comprising:
 a first image data acquiring unit configured to acquire first image data when preliminary light emission is not performed;

a second image data acquiring unit configured to acquire second image data when preliminary light emission is performed;

a face area detection unit configured to detect a face area of a subject from at least one of the first image data acquired by the first image data acquiring unit and the second image data acquired by the second image data acquiring unit;

a luminance comparison calculation unit configured to compare the first image data and the second image data with respect to luminance based on the face area of the subject detected by the face area detection unit and calculate at least one luminance comparison value; and a main light emission amount determination unit configured to determine an amount of main light emission based on the at least one luminance comparison value calculated by the luminance comparison calculation unit.

2. The image capture apparatus according to claim 1, wherein the luminance comparison calculation unit sets weighting to difference image data between the first image data and the second image data to obtain the at least one luminance comparison value.

3. The image capture apparatus according to claim 2, wherein the luminance comparison calculation unit enlarges weighting to the face area within the difference image data to obtain the at least one luminance comparison value.

4. The image capture apparatus according to claim 1, wherein the luminance comparison calculation unit compares and calculates luminance in the face area detected from the first image data and luminance in the face area detected from the second image data to obtain the at least one luminance comparison value.

5. The image capture apparatus according to claim 1, further comprising a control unit configured to perform photography based on a camera parameter which is set before photography is performed.

6. The image capture apparatus according to claim 5, wherein the camera parameter is set in response to identifying, by a preliminary light emission, that an object hindering flash photography exists in a scene.

7. The image capture apparatus according to claim 1, wherein in a case where the face area detection unit has failed to detect the face area before photography is performed, the face area detection unit performs setting of a face area on a captured image obtained before the photography is performed.

8. A control method for an image capture apparatus, comprising:

using a processor to perform the steps of:
acquiring a first image data when preliminary light emission is not performed;
acquiring a second image data when preliminary light emission is performed;
detecting a face area of an subject from at least one of the first image data acquired by the first image data acquiring step and the second image data acquired by the second image data acquiring step;
comparing the first image data and the second image data with respect to luminance based on the face area of the subject detected by the face area detection step;
calculating at least one luminance comparison value; and
determining an amount of main light emission based on the at least one luminance comparison value.

9. The control method for an image capture apparatus according to claim 8, wherein the step of calculating includes a step of setting weighting to difference image data between the first image data and the second image data.

10. The control method for an image capture apparatus according to claim 9, wherein the step of calculating includes a step of enlarging weighting to the face area within the difference image data.

11. The control method for an image capture apparatus according to claim 8, wherein the step of calculating includes a step of comparing and calculating luminance in the face area detected from the first image data and luminance in the face area detected from the second image data.

12. The control method for an image capture apparatus according to claim 8, further comprising a control step of performing photography based on a camera parameter which is set before photography is performed.

13. The control method according to claim 12, wherein the camera parameter is set in response to identifying, by a preliminary light emission, that an object hindering flash photography exists in a scene.

14. The control method for an image capture apparatus according to claim 8, wherein in a case where the step of detecting a face area has failed to detect the face area before photography is performed, the face area detection step includes a step of setting of a face area on a captured image obtained before the photography is performed.

15. An image capture apparatus comprising:

an image data acquiring unit configured to acquire the image data;

a face area detection unit configured to detect a face area of a subject based on the image data acquired by the image data acquiring unit; and a main light emission amount determination unit configured to determine an amount of main light emission based on a luminance of a first image data acquired when a preliminary light emission is not performed and the luminance of a second image data acquired when the preliminary light emission is performed, so as the luminance of the face area of the object to become target luminance, wherein the main light emission amount determination unit determines the amount of main light emission by setting the area corresponding to the face area of the object of the second image data from among the area of the first image data, in case the face area of the object could not be detected based on the first image data but detected based on the second image data.

16. The image capture apparatus according to claim 15, wherein the main light emission amount determination unit determines the amount of main light emission by giving a priority to the luminance of the area of the first image data corresponding to the luminance of the face area of the second image data compared to the luminance of the other area.

17. The image capture apparatus according to claim 15, wherein the main light emission will not be performed in case that a highly reflective object is included in the image frame of the second image data.

18. A method performed in an image capture apparatus which includes an image data acquiring unit, face area detection unit, main light emission amount and determination unit, the method comprising:

via the image data acquiring unit, acquiring image data;
via the face area detection unit, detecting a face area of a subject based on the image data acquired by the image data acquiring unit; and
via the main light emission amount determination unit, determining an amount of main light emission based on a luminance of a first image data acquired when a preliminary light emission is not performed and the luminance of a second image data acquired when the preliminary light emission is performed, so as the luminance of the face area of the object to become target luminance,
wherein the main light emission amount determination unit determines the amount of main light emission by setting the area corresponding to the face area of the object of the second image data from among the area of the first image data, in case the face area of the object could not be detected based on the first image data but detected based on the second image data.

19. The method according to claim 16, wherein the main light emission amount determination unit determines the amount of main light emission by giving a priority to the luminance of the area of the first image data corresponding to the luminance of the face area of the second image data compared to the luminance of the other area.

20. The method according to claim 16, wherein the main light emission will not be performed in case that a highly reflective object is included in the image frame of the second image data.

* * * * *